Figure 1:
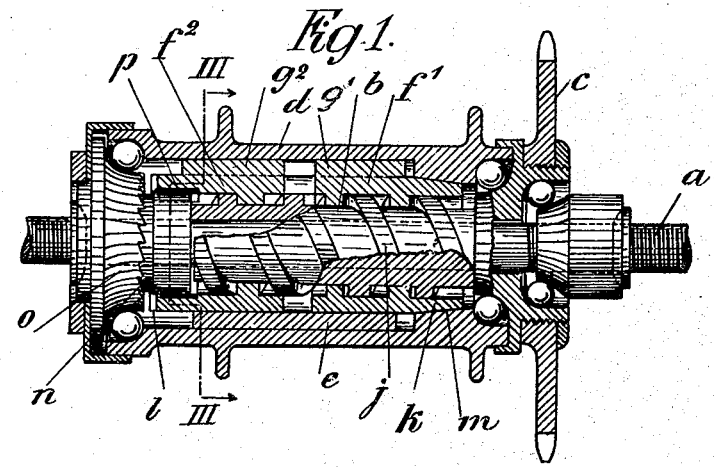

Nov. 8, 1927.  F. J. OLSEN  1,648,421
BACK PEDALING BRAKE
Filed July 16, 1926   3 Sheets-Sheet 1

Inventor
F. J. Olsen
By Lampure, Carry Yard Shaupure
Attys.

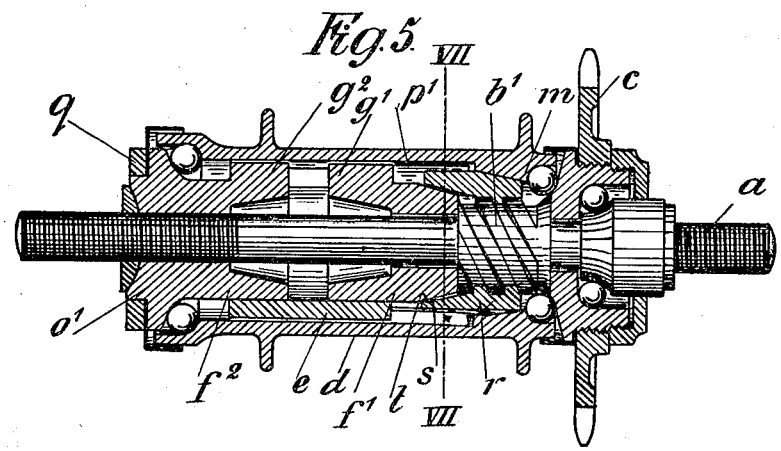
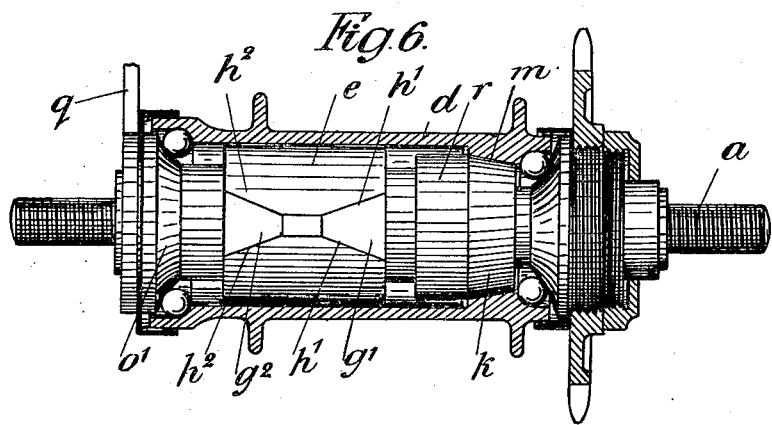
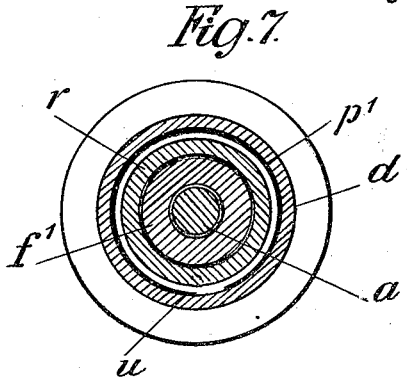

Nov. 8, 1927.  1,648,421
F. J. OLSEN
BACK PEDALING BRAKE
Filed July 16, 1926    3 Sheets-Sheet 3
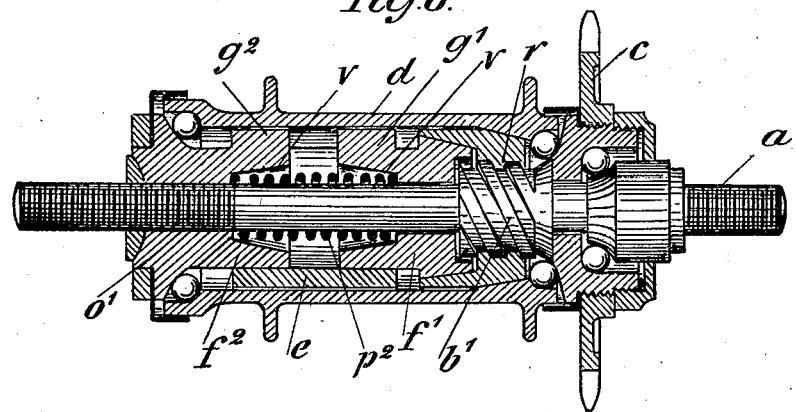
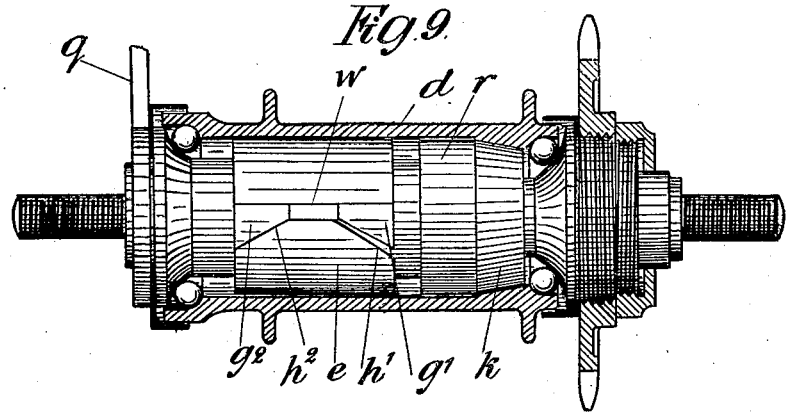
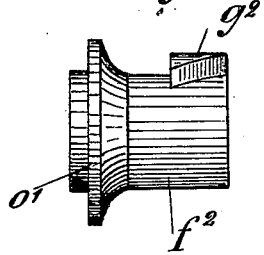 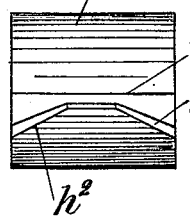 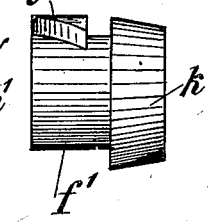
Inventor
F. J. Olsen
By
Attys.

Patented Nov. 8, 1927.

1,648,421

UNITED STATES PATENT OFFICE.

FREDERIK JOHANNES OLSEN, OF ESKEBJERGGAARD PR. ALLESHAVE, DENMARK.

BACK-PEDALING BRAKE.

Application filed July 16, 1926, Serial No. 122,901, and in Denmark July 25, 1925.

This invention relates to back pedaling brakes for bicycles and motor cycles of the kind in which a brake sleeve having a gap or slot extending throughout its length is adapted to be expanded into frictional contact with an outer hub by wedge action brought about by the rotation of a driving member provided with cam faces or screw-threads or the like, and the objects of the invention are to provide a brake mechanism of this type which contains a small number of single and heavy parts, ensures a uniform and powerful braking action and can be easily put together and separated by any person.

With these objects in view the back pedaling brake according to the invention contains two independent oppositely facing heavy wedges lying in the same axial line and entering the gap of the brake sleeve from opposite ends, one of said wedges being influenced directly or indirectly by the rotatable driving member for producing the braking action while the other wedge in this instance is held stationary whereby both wedges will expand the sleeve by exerting peripherically directed pressures against the edges of the sleeve at the said gap. The brake sleeve thereby can be expanded uniformly throughout its entire length and periphery.

A back pedaling brake showing this characteristic feature can be embodied in several forms, two of which presenting remarkable properties will be more closely described.

In one of these constructions both of the wedge members mesh with the driving member with a certain clearance so that they can perform a limited axial movement relative to the driving member, and one of the wedge members is provided at one end with a clutch element adapted to be coupled to a stationary part during braking while the other wedge member is provided at one end with a clutch element or a stop face adapted to engage a corresponding clutch element or a shoulder or the like on the outer hub on forward pedaling. In this construction the expansible brake sleeve is active during back pedaling as well as during forward pedaling.

In the second embodiment named above the brake sleeve is only expanded against the outer hub during braking, and the main characteristic feature of this embodiment consists therein that one of the wedge members is normally stationary so that it can neither be rotated nor displaced axially while the other wedge member can be displaced by a clutch member meshing with the rotatable driving member and adapted to couple the same to the outer hub on forward pedaling. It will be understood that with this arrangement the two wedges and the brake sleeve never rotate since one of the wedge members is stationary and both wedge members constantly engage the gap of the brake sleeve.

Figure 2:
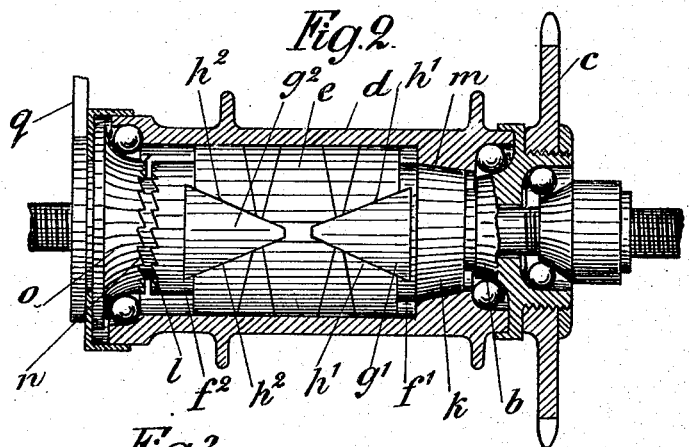
Figure 3:
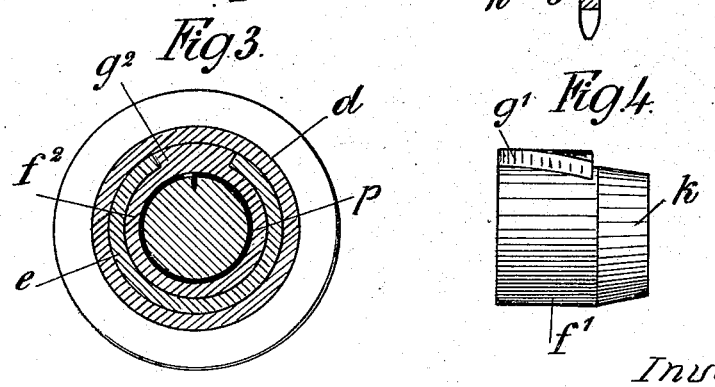
Figure 4:
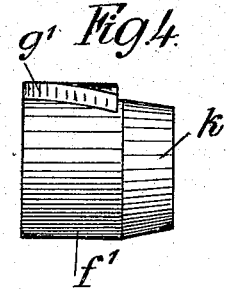

Other features of the invention will appear from the following description of some embodiments shown by way of example on the accompanying drawings in which:

Figure 1 is a partial vertical section through a coaster hub constructed according to the invention, Figure 2 is a partial horizontal section through the same, Figure 3 is a cross section on the line III—III in Figure 1, Figure 4 is a side elevation of one of the wedge members, Figures 5 and 6 are views similar to Figures 1 and 2 respectively of a second embodiment of the invention, Figure 7 is a cross section on the line VII—VII of Figure 5, Figures 8 and 9 are a vertical section and a partial horizontal section respectively of a third embodiment and Figures 10, 11 and 12 are side elevations of details of the same.

In all of the views like letters indicate similar parts.

In the coaster hub shown in Figures 1–4 $a$ is the fixed shaft, $b$ the rotatable driving member with the sprocket $c$ for the sprocket chain, and $d$ is the cylindrically bored outer hub in which is inserted a cylindrical spring-like brake sleeve $e$, for instance of hardened steel or bronze, which sleeve is split throughout its length, the slot or gap thus produced being engaged by two wedge members $f^1$ and $f^2$. Each wedge member consists of a cylinder surrounding the driver $b$ like a nut and threaded thereon and provided externally at one side with a comparatively large wedge $g^1$ and $g^2$ respectively, which can affect corresponding sloping faces $h^1$ and $h^2$ respectively formed at the end of the slot of the sleeve. As clearly shown in Figure 2 the two wedges face oppositely for the purpose indicated below. The internal threads of the wedge members as shown in Figure 1 engage with a considerable clearance between the threads $j$ of the driver so that each wedge member if left alone is capable of performing a certain axial movement relative to the driver.

The wedge member $f^1$ at one end has a conical clutch element $k$ adapted to be coupled by friction to a similar conical clutch element or seat $m$ at the inner side of the outer hub, and the wedge member $f^2$ at one end is provided with a complete circumferential row of teeth $l$ adapted to engage a corresponding row of teeth $n$ formed on a nut or brake anchor $o$ which in a well known manner is held stationary on the shaft $a$ by means of an arm $q$.

In Figures 1 and 2 the various parts of the coaster hub are shown in the positions occupied during forward pedaling, the rows of teeth $n$ and $l$ being disengaged from each other, while the clutch element $k$ and the brake sleeve $e$ are pressed against the clutch element $m$ and the outer hub respectively whereby the latter through two friction clutches is coupled to the sprocket $c$. If now the pedals are kept immobile while the vehicle runs forward the clamping action of the driver ceases; the brake sleeve and the wedge member $f^1$ are released from the outer hub so that free running can now take place, and a stationary friction spring $p$ pressing against the inner side of the wedge member $f^2$ with a certain pressure will then hold the brake sleeve and the wedge members. On back pedaling the wedge member $f^1$, the threads of which in this instance abut against the left edge of the driver threads, is displaced still more towards the left thereby carrying the brake sleeve and the other wedge member $f^2$ with it, the last named wedge member $f^2$ being prevented by means of the spring $p$ from rotating backwards with the driver. The teeth $l$ and $n$ hereby are brought into engagement with each other whereby the displacement of the wedge member $f^2$ towards the left is stopped, and on further back pedaling the wedge member $f^1$ is moved still farther to the left, the brake sleeve thus being expanded uniformly throughout its length and pressed forcibly against the interior surface of the outer hub by means of the wedges driven in opposite directions into the gap of the sleeve. Thus braking is effected. On forward pedaling the brake sleeve due to its elasticity will contract and release itself from the outer hub, and the teeth $n$ and $l$ too are disengaged by the screw threads of the driver acting upon the wedge member $f^2$ and displacing the same and thereby the brake sleeve and the other wedge member $f^2$ to the right. As soon as the two rows of teeth are disengaged rotation of the wedge members and the brake sleeve together with the driver is checked or retarded by the spring $p$ which serves as a brake, so that the said parts are continuously moved to the right at the rotation of the driver, until the wedge member $f^1$ is stopped by and coupled to the clutch surface $m$ of the outer hub, whereupon the brake sleeve on continued forward pedaling is expanded and coupled to the outer hub by the wedges entering the sleeve gap from opposite ends.

It will be understood from the above description that the explained operation of the wedges and the brake sleeve depends thereon that the wedges can be moved to a certain extent towards and away from each other, i. e. that the wedge members engage the driver with a certain clearance. It is obvious that such clearance may be provided for whether the wedge members are provided with proper screw threads as shown or with similar engaging means, such as cam faces.

It is to be noted that the wedge members need not be formed as complete nuts although this arrangement is preferable in order to guide the wedge members effectively in the axial direction. Also the clutch elements arranged on the ends of the wedge members and the clutch elements co-acting therewith may be constructed in different ways without departing from the principle underlying the invention. Thus for instance the conical friction clutch $k$, $m$, could be completely dispensed with, the outer hub in this case merely being provided with a suitable stop surface or shoulder for stopping the axial movement of the wedge member $f^1$ at forward pedaling.

The two embodiments of the invention shown in Figures 5–7 and Figures 8–12 respectively mainly differ from that described above therein that neither of the two wedge members is in direct engagement with the driver, but one of the wedge members only is indirectly acted upon by the driver while the other wedge member is stationary.

Referring now more particularly to Figures 5–7 the wedge member $f^2$ in this embodiment is made integral with the nut $o^1$ screwed onto the shaft $a$ and maintained in position by the arm $q$. The other wedge member $f^1$ consists of an annular body loosely mounted on the shaft $a$. The construction of the wedges $g^1$ and $g^2$ proper and their manner of engaging the wedge faces $h^1$ and $h^2$ at the ends of the sleeve gap is the same as in the coaster hub shown in Figures 1–4. The letter $r$ designates an annular internally screw threaded clutch member meshing with the screw threads of the driver $b^1$ and provided at the right end, Fig. 6, with a conical clutch element $k$ adapted on forward pedaling to be coupled by friction to a similar conical surface $m$ formed upon the interior surface of the outer hub $d$. At its left end the clutch member $r$ has an internal conical surface $s$ adapted on back pedaling to engage a similar surface $t$ on the right end of the wedge member $f^1$.

The flat friction spring $p^1$ here is in contact with the inner cylindrical surface of the outer hub and by means of an inturned lip $u$, Figure 7, engages a groove cut in the clutch member $r$, so that the spring can not rotate relative to this clutch member.

The coaster hub thus far described operates in the following manner:

In Figures 5 and 6 the various parts occupy the positions corresponding to normal forward pedaling, the brake sleeve $e$ having been released from the outer hub $d$, while the clutch member $r$ by means of the driver has been pressed towards the conical surface $m$ of the outer hub to thereby couple the driver to this hub. If now the pedals are kept immobile while the vehicle runs forward the clamping action of the driver ceases, and by means of the friction spring $p^1$ the constantly rotating outer hub $d$ will turn the clutch member $r$ around the driver thereby simultaneously displacing the clutch member to the left so that the clutch surfaces $m$ and $k$ are released from each other whereby free wheeling takes place. The clutch member $r$ hereby will be displaced so far to the left until the conical surfaces $s$ and $t$ engage each other with a slight pressure. If the pedals are thereafter moved backwards the clutch member $r$ pushes the wedge member $f^1$ to the left whereby the brake sleeve is carried a little in the same direction so that the brake sleeve will be expanded uniformly throughout its length and circumference by the two wedges $g^1$ and $g^2$; thus braking takes place. On forward pedaling the friction spring $p^1$ has the effect that the clutch member $r$ does not rotate as a unit with the driver, but is displaced to the right and thereby again coupled to the outer hub.

The construction shown in Figures 8–12 mainly differs from that shown in Figures 5–7 therein that the annular friction spring ensuring the axial displacement of the clutch member is omitted and replaced by a compressed helical spring $p^2$ surrounding the shaft $a$. The ends of this spring abut against the bottoms of cavities $v$, $v$ formed in the wedge members $f^1$ and $f^2$ respectively. This spring always tends to displace the wedge member $f^1$ to the right and to move the clutch member $r$ in the same direction.

On forward pedaling the coaster hub acts in the same manner as explained above with reference to Figures 5–7. When the pedals are held stationary while the bicycle or motor cycle runs forward the continuously rotating outer hub turns the clutch member $r$ and thereby moves the same and the wedge member $f^1$ a little to the left so as to release the clutch member from the outer hub whereby free-wheeling takes place. On back pedaling the joint effect of the rotation of the driver and the braking action exerted by the non-rotatable wedge member $f^1$ upon the clutch member $r$ will be that the latter and the wedge member $f^1$ are displaced to the left, so that the brake sleeve is expanded by the two wedges in a manner similar to that explained above. In the embodiment shown in Figures 8–12 the wedges $g^1$ and $g^2$ have each an axially directed edge, and the brake sleeve has a corresponding axial straight edge $w$ as shown in Figures 9 and 11. This arrangement is made mainly for the purpose of precluding any possibility of the wedge member $f^1$ on forward pedaling being pressed too forcibly against and thereby exerting a too high braking action on the clutch member $r$ and the driven wheel of the vehicle.

If desired the stationary wedge member $f^2$ may consist of a separate member rigidly secured in any suitable manner.

Furthermore in all of the embodiments described the wedge members could be guided relative to each other by being provided with intermeshing rectangular teeth or the like allowing mutual axial displacement of the wedge members but preventing any mutual rotation thereof. The more simple construction shown on the drawings are, however deemed preferable.

Having thus fully described my invention I claim as new and desire to secure by Letters Patent:

1. In a brake mechanism, the combination of an axle, a hub thereon, a driving member, a brake anchor, an expansible friction brake sleeve having a single slot throughout its length and mounted within the hub, said brake sleeve having inclined edges at the ends of its slot, two oppositely facing wedges lying in the same axial line and entering the slot of the brake sleeve from opposite ends, and means including said driving member and brake anchor for moving one of said wedges axially towards the other wedge while holding the latter stationary to thereby expand the brake sleeve by pressures exerted peripherically on the said inclined edges against said hub.

2. In a brake mechanism, the combination of an axle, a hub thereon having a stop face, a rotatable driving member, a brake anchor having a clutch element, an expansible friction brake member having a slot throughout its length and mounted within the hub and two oppositely facing wedge-like members intermeshing both with the driving member with a certain clearance so as to allow the wedge-like members to perform a limited axial movement relative to the driving member, said wedge-like members engaging the slot of the expansible friction brake member from opposite ends and one of the wedge-like members having a clutch element thereon, so that upon forward rotation of the driving member the wedge-like members and the friction brake member are displaced axially until stopped by said stop face on the hub whereafter upon further forward rotation of the driving member the friction brake member is expanded by the wedge-like members against said hub to thereby couple the same to the driving member, while upon backward rotation of the driving member the wedge-like members and the friction brake member are displaced axially in the opposite direction to thereby couple the one wedge-like member to the brake anchor through said clutch elements and then expand the brake member for braking purposes.

3. The brake mechanism of claim 2, in which said driving member on forward rotation influences one wedge-like member directly and on backward rotation influences the other wedge-like member directly.

4. The brake mechanism of claim 1, in which one of said oppositely facing wedges is stationary so that normally it can neither rotate nor move axially and constantly engages the slot of the said expansible brake sleeve to hold the latter against rotation.

5. The brake mechanism of claim 1, in which one of the said two wedges is stationary, and a clutch member is provided which meshes with the driving member and upon forward rotation of the driving member couples the same to the hub and upon backward rotation of the driving member pushes the non-stationary wedge axially towards the other wedge to thereby expand the brake sleeve against the hub for braking purposes.

6. The brake mechanism of claim 1, in which one of said wedges is made integral with said brake anchor.

7. In a coaster hub the combination of an outer hub having a clutch element, an expansible non-rotatable brake sleeve mounted within said outer hub and having a longitudinal slot throughout its length, two oppositely pointing wedge members constantly engaging said slot at opposite ends thereof, one of said wedge members being stationary, and the other displaceable, an axially displaceable and rotatable clutch member, and a rotatable driving member engaging said clutch member by a screw-like engagement, so that upon rotation of the driving member in one direction the clutch member is displaced axially to couple the driving member to the outer hub through said clutch element on the latter, while on rotation of the driving member in the opposite direction the clutch member forces the non-stationary wedge member towards the stationary wedge member to thereby expand the brake sleeve for braking purposes.

8. The coaster hub of claim 7, in which spring means constantly tend to move the displaceable wedge member axially away from the stationary wedge member.

9. The coaster hub of claim 7, in which a compressed helical spring is arranged between the two wedge members and constantly tends to move them away from each other.

10. The coaster hub of claim 7, in which the said expansible brake sleeve is made from spring material so that it is capable of contracting and releasing itself from the outer hub as soon as the wedge members cease to expand the brake sleeve.

In testimony whereof I have affixed my signature.

FREDERIK JOHANNES OLSEN.